Oct. 16, 1928.

D. B. PERRY 1,687,688

MECHANICAL LUBRICATOR FOR CHAINS

Filed May 20, 1927

David B. Perry
INVENTOR.

BY Robert V. Morse

ATTORNEY.

Patented Oct. 16, 1928.

1,687,688

UNITED STATES PATENT OFFICE.

DAVID B. PERRY, OF ITHACA, NEW YORK, ASSIGNOR TO MORSE CHAIN COMPANY, OF ITHACA, NEW YORK, A CORPORATION OF NEW YORK.

MECHANICAL LUBRICATOR FOR CHAINS.

Application filed May 20, 1927. Serial No. 192,958.

This invention relates to the lubrication of machinery, and is especially applicable to the lubrication of power chains and similar power transmission devices, such as are used in mills and factories. Such power chains normally run at fairly high speeds, and it is not desirable to run them directly in a bath of oil, owing to the drag and power loss. While no great amount of lubrication is required for a power chain under normal conditions, it is desirable that the lubricant be applied in such a way as to penetrate to the pins or joints where the wear occurs, and this may be done by periodically dropping oil on the chain while it is in operation.

It is often convenient to operate the lubricator from adjacent machinery, and in some cases the motion is very slow. As only a small amount of lubrication is required with a properly designed power chain, a slow motion would suffice if it were not for leakage in the lubricator mechanism, as sometimes occurs in pumping devices.

One object of my invention is to provide a mechanism which will positively deliver measured quantities of oil as desired, regardless of how slowly it is operated, and which will not develop any tendency to leak, thru wear or ordinary errors of workmanship. Other objects are to eliminate valves, pistons, and similar parts which might become leaky or clogged in operation; to make a device which is easily installed in the ordinary chain case, without piercing the case below the oil level; to make a durable, simple, and reliable device; and in general, to make a practical and effective lubricator for this class of service, and analogous applications.

Referring now to the drawings forming part of this application,

Similar reference numerals refer to similar parts thruout the various views.

While the present invention may be applied to the lubrication of various types of machinery, it will be described by way of illustration in connection with the lubrication of power chain drives of the link belt or silent chain type.

Figure 1:
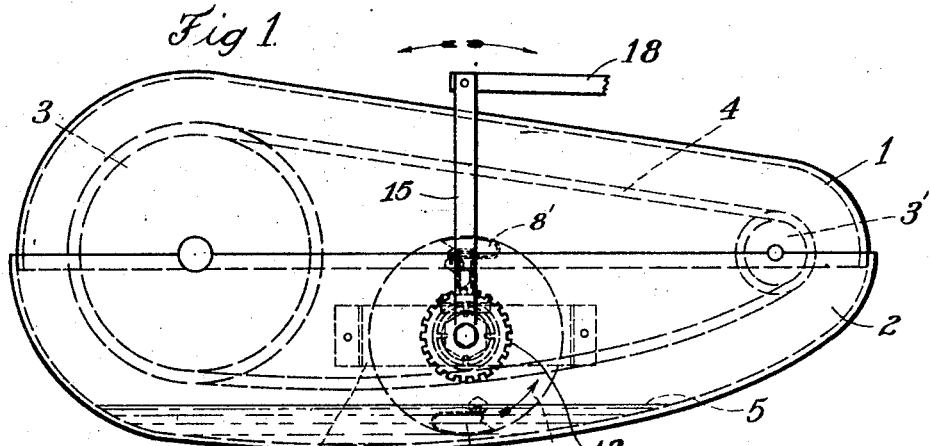
Fig. 1 is a side elevation of a chain case showing the manner of applying the lubricator.

Referring first to Fig. 1, a chain case consisting of an upper part or cover 1 and a lower part or base 2 is illustrated, within which is located a pair of sprockets 3 and 3', on which run the chain 4 as indicated in dotted lines. The upper part 1 of the chain case is fitted within the lower part 2, so that any oil 5 which is thrown off the chain will drop back into the bottom of part 2, which is utilized as an oil reservoir. The level of the oil in this reservoir is preferably below the lowest point of the chain drive so that power will not be wasted in splashing the oil about unnecessarily.

Figure 2:
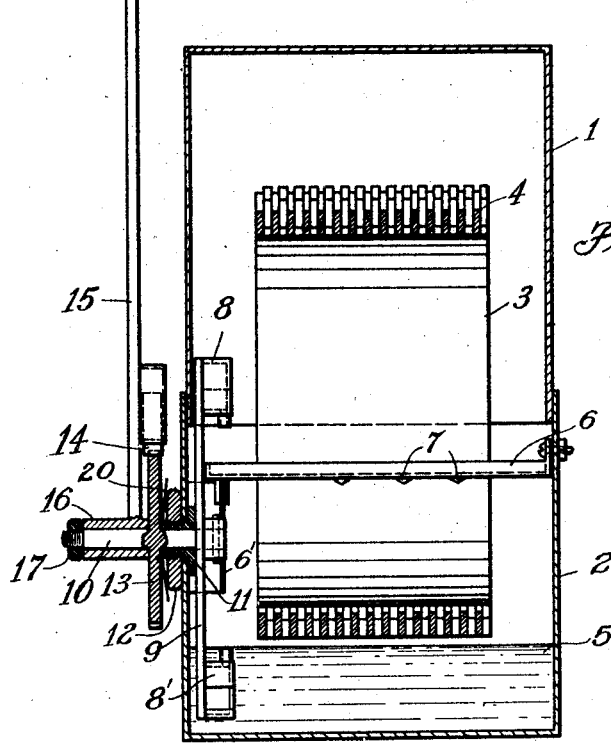
Fig. 2 is a transverse cross-section thru the case substantially in the plane of the lubricating device.

Referring now to Fig. 2, a trough 6 having an aperture 7 thru which oil may drop is mounted transversely in the chain case 2 below the upper and lower strands of the chain. One end of the trough 6 may be secured directly to the side of the case 2, while the other end is carried by a bracket 6' which straddles the rotating parts of the mechanism. In order to carry oil up from the reservoir and discharge it into this trough 6, I provide one or more buckets 8 and 8', carried on a rotatable member 9, which is keyed to the shaft 10. Any other equivalent form of wheel pump or liquid elevator may be used, as for example the spiral pump of Archimedes. The shaft 10 may be rotatably mounted in bearings in any suitable manner, and for example it is shown in Fig. 2 journalled in a bearing member 11, having a flanged head within the case 2 and a screw threaded portion extending thru a hole in the case to the outside on which is screwed a nut 12 so as to clamp it in place. A ratchet wheel 13 is secured to the shaft 10 and is adapted to be driven by the pawl 14 attached to the arm 15. The arm 15 has a bearing 16 which is free to turn on the end of the shaft 10 and is held from longitudinal movement by the nut 17. The arm 15 is usually connected to any suitable portion of the adjacent machinery in the mill or factory where the chain drive is located, the connection usually being thru an arm 18 which has a reciprocating motion. The particular form of connection will vary of course in different installations, as will be obvious to those skilled in the art. In order to prevent the ratchet wheel 13 from turning too freely so that it will remain in place when the ratchet pawl 14 is being drawn backward to engage another tooth, the spring washer 20 is fitted between the nut 12 and the ratchet wheel 13. This also holds the bucket wheel 9 properly in place and prevents end play and lost motion.

Figure 3:
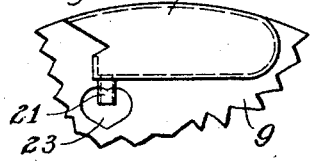
Fig. 3 is a detail partly in cross-section of one form of lubricator bucket.
Figures 4, 5:
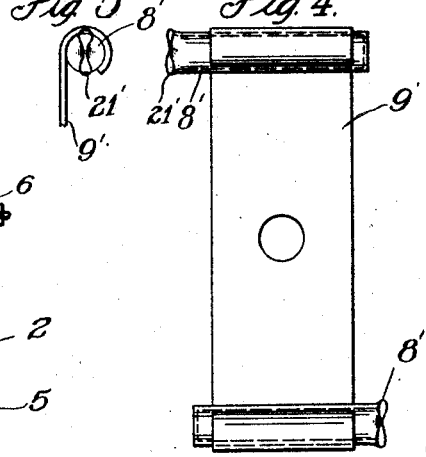
Fig. 4 illustrates another type of bucket.
Fig. 5 is an end view of the form of bucket shown in Fig. 4.

As the bucket wheel 9 is rotated step by step in the direction of the arrow in Fig. 1, the bucket 8 or 8′ passing below the level of the oil 5 becomes filled with oil and as the bucket in its rotation is gradually raised above the oil, the oil flows down into the back or bottom of the bucket. As the rotation of the member 9 continues, the bucket is brought to a position above the trough 6 and the oil flows out the outlet 21 and down into the trough 6. The outlet 21 is made in the form of a short spout (as shown in Fig. 3) projecting from the bucket 8 so that the oil will definitely drop from the spout 21 and not run back around the outside of the bucket 8 and drop off at various other points; also a hole 23 may be cut in the member 9 back of the spout 21 to prevent the oil from being led over to the member 9 by capillary attraction and escaping down the face of the member 9 instead of dripping from the spout 21. The elevating buckets 8 and the rotating member 9 may be made in various forms as will be obvious to those skilled in the art. For example, in Fig. 4, the member 9 instead of being in the form of a disc is made in the form of a strip 9′, to the ends of which are secured the buckets 8′, which are in the form of cylinders closed at one end while the other end is flattened or crimped (as shown in Fig. 5), so as to form a spout or mouth 21′ from which the oil may drip. It is desirable that whatever spout or mouth is used on the elevating bucket, it should be so shaped that the oil will drop from it instead of running back on the outside of the bucket. Another form of elevator or pump which may be used is the well-known spiral pump of Archimedes. The distinguishing feature in all these pumps or elevators is that they have no valves, the liquid is retained in them by gravity, and they will feed out definite amounts of liquid as they are rotated, that is, they have no leakage and will therefore pump regardless of how slow the motion of rotation may be. This gives them a reliability which makes them particularly suitable for the lubrication of machinery such as a drive chain where the amount of lubrication required is not large and the motion by which the lubricator is driven may in some cases be very slow.

While I have in the foregoing described certain preferred forms of my invention, it will be understood that these are merely by way of illustration and that the apparatus is susceptible to various modifications and adaptations as will be obvious to those skilled in the art without departing from the scope of the invention as defined in the following claims:

1. In a mechanical lubricator for chain drives, the combination of a case adapted to contain a chain drive, the lower portion of the case forming an oil reservoir below the lower strand of the chain drive, an oil conducting means extending transversely across the case between the upper and lower strands of the chain drive, and arranged so that oil fed to the conducting means may drop upon the lower strand of the chain, a shaft passing thru a wall of the case above the level of the oil in the reservoir, means for rotating said shaft, and means rotated by said shaft for elevating oil from said reservoir up to a region above said conducting means from which the oil may flow down to said conducting means, said elevating means including a container which dips into the oil of the reservoir, the oil being retained in said container by gravity while being elevated.

2. In a mechanical lubricator, the combination of a case whose lower portion is adapted to form an oil reservoir, oil conducting means having an orifice thru which oil may flow to the mechanism to be lubricated, revolvable means for elevating the oil from the reservoir and delivering it to the oil conducting means, the oil being retained in said revolvable means by gravity while being so elevated, a supporting means straddling said revolvable means and supporting one end of the oil conducting means, a rotatable shaft on which said revolvable means is mounted, a ratchet on said shaft, an oscillating driving member for rotating said ratchet and shaft, whereby the revolvable means may be driven to elevate the oil.

3. In a mechanical lubricator for chain drives, the combination of a case adapted to contain a chain drive, the lower portion of the case forming an oil reservoir below the lower strand of the chain drive, an oil conducting means extending transversely across the case between the upper and lower strands of the chain drive and arranged so that oil fed to the conducting means may drop on the lower strand of the chain, said conducting means being supported from the two sides of the case, a shaft passing thru a side of the case above the level of the oil in the reservoir, a ratchet mounted on said shaft, oscillating means for driving said ratchet, and means rotated by said shaft for elevating oil from said reservoir up to a region above said conducting means, said elevating means including a container which dips into the oil of the reservoir, the oil being retained in said container by gravity while being elevated.

4. In a mechanical lubricator for chain drives, the combination of a case adapted to contain a chain drive, the lower portion of the case forming an oil reservoir below the lower strand of the chain drive, an oil conducting means extending transversely across the case between the upper and lower strands of the chain drive and arranged so that oil fed to the conducting means may drop on the lower strand of the chain, said conducting means being supported from the two sides of the case, a shaft passing thru a side of the case above the level of the oil in the reservoir, a ratchet mounted on said shaft, oscillating means for driving said ratchet, and means rotated by said shaft for elevating oil from said reservoir up to a region above the conducting means from which the oil may flow down to said conducting means, said elevating means including a container which dips into the oil of the reservoir, the oil being retained in said container by gravity while being elevated, said container having a spout projecting a sufficient distance so that the oil will definitely drop from the spout when the container is being emptied.

In testimony whereof, I have hereunto signed my name this 16th day of May, 1927.

DAVID B. PERRY.